United States Patent
Farwell

[19]

[11] Patent Number: 6,038,518

[45] Date of Patent: Mar. 14, 2000

[54] ERROR CORRECTION OF SYSTEM TRANSFER FUNCTION BY USE OF INPUT COMPENSATION

[75] Inventor: William D. Farwell, Thousand Oaks, Calif.

[73] Assignee: Hughes Electronics Corporation, El Segundo, Calif.

[21] Appl. No.: 08/923,362

[22] Filed: Sep. 4, 1997

[51] Int. Cl.[7] .................................................... H03K 5/13

[52] U.S. Cl. .............................. 702/89; 702/90; 378/14; 324/76.77

[58] Field of Search ....................... 378/19, 4; 360/66.48, 360/75, 77.17; 702/89; 324/76.77, 609, 76.79; 341/118

[56] References Cited

U.S. PATENT DOCUMENTS 5,220,589  6/1993  Gard .......................................... 378/19
5,351,000  9/1994  Farwell .................................. 324/76.77
5,777,813  7/1998  Sun et al. ................................... 360/66

*Primary Examiner*—Kamini Shah
*Attorney, Agent, or Firm*—Bradley K. Lortz; Michael W. Sales

[57] ABSTRACT

A technique to modify the input data to any system so as to cancel errors in the transfer function of that system. The system error response to each possible input amplitude transition is determined. A compensating input sequence is calculated which compensates for this error. The error-correcting sequence is stored in memory for each possible transition. These pattern sequences exactly cancel errors in the response to each of the possible, individual sample-to-sample transitions. For each of any series of input data sample transitions, the appropriate correction sequence is recalled from memory. The composite corrected input is the sum of Y correction sequences from Y preceding sample transitions.

14 Claims, 1 Drawing Sheet

6,038,518

ERROR CORRECTION OF SYSTEM TRANSFER FUNCTION BY USE OF INPUT COMPENSATION

TECHNICAL FIELD OF THE INVENTION

This invention relates to techniques for modifying the input data to any system so as to cancel errors in the transfer function of that system.

BACKGROUND OF THE INVENTION

A common problem in electronics is to assure that various information handling systems produce the desired responses to input stimuli, despite a wide variety of mechanisms which tend to distort and corrupt the information output. Generally, information handling systems are characterized by a transfer function, which describes the output as a result of any input. Any differences between the actual versus the desired transfer function constitute distortion. There are a variety of conventional techniques employed to minimize distortion, the most common of which is negative feedback. Another common technique is filtering, to correct for deviations in frequency response.

The invention can be applied in systems where feedback is impractical (e.g., where some components are remote, such as a data transmission system). Moreover, the invention can also be employed to achieve a more ideal response with no degradation of stability.

An error correction technique in accordance with this invention offers advantages over conventional filtering in that it compensates for all possible forms of distortion, whereas filtering is limited in the types of distortion which can be cancelled.

SUMMARY OF THE INVENTION

An aspect of this invention is a technique to modify the input data to any system so as to cancel errors in the transfer function of that system. This is done by first sampling and digitizing the input (which is typically a time-varying voltage, current, or other analog signal). A digital correction algorithm is then applied, and the signal is re-converted to its analog form, which constitutes a compensated input to the target system.

The digital correction algorithm employs a priori knowledge (obtained by measurement or calculation) of the target system response to each possible input transition. Each sample of the input, along with the immediately previous sample, fully defines a unique transition, to which the target system exhibits a unique response. If the system response to a given transition is known to deviate from the ideal response, then an alternative input sequence, stored in digital memory, is applied instead, which causes a system response which most closely approximates the ideal.

For each of a series of Y input data sample transitions, the appropriate correction sequence is called up and added. A composite, compensated input is constructed as the sum of Y correction sequences from the Y preceding sample transitions.

Error correction techniques in accordance with the invention can correct the response of many important analog systems such as transmission media, transducers, and data converters. It can achieve error correction which would otherwise not be possible; for example, achieving an ideal pulse response in a discontinuous transmission line, or in the speaker of an audio reproduction system.

Also, this error correction method uses exactly the same algorithm and implementation hardware for any system; only the stored data changes. Thus, it is fully programmable for use on different systems, or to adjust to changes in transfer function in a particular system.

BRIEF DESCRIPTION OF THE DRAWING

These and other features and advantages of the present invention will become more apparent from the following detailed description of an exemplary embodiment thereof, as illustrated in the accompanying drawings, in which.

DETAILED DESCRIPTION OF THE PREFERRED EMBODIMENT

Figure 1:
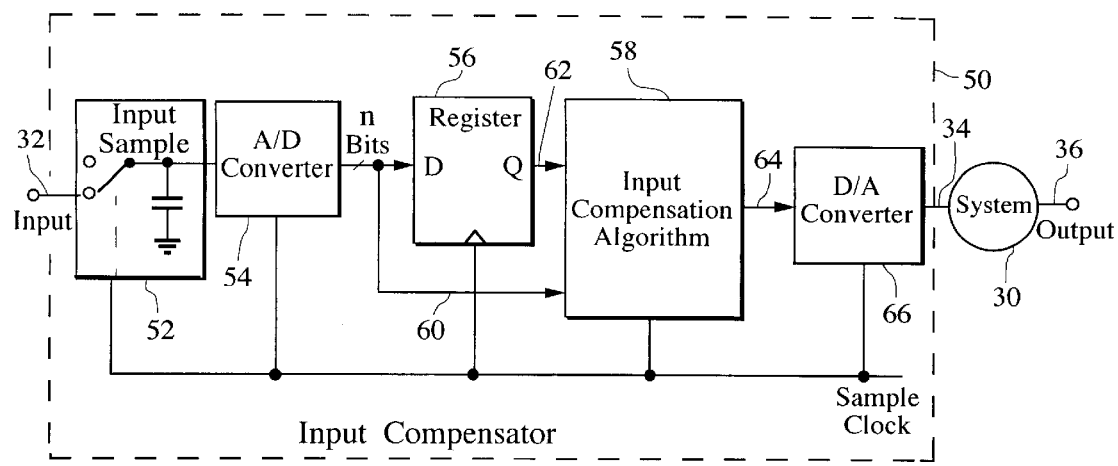
FIG. 1 is an illustration of an input compensation system embodying the invention.

FIG. 1 is an illustration of an exemplary input compensator 50 embodying the invention for providing error correction by input compensation to a system 30 to be corrected. The compensator 50 receives a system input 32 which would, in the absence of the compensator, drive the system 30, and produces a compensated input 34, which drives the system 30, which in turn produces a system output 36. The input compensator 50 comprises an input sampler 52 which samples the input signal 32 at a predetermined rate, an analog-to-digital (A/D) converter 54 which converts the samples to a binary amplitude representation of n bits, a register 56 which stores the value of the immediately previous sample, a digital compensation algorithm 58 which responds to the current sample value 60 and the previous sample value 62 to produce a digital representation 64 of a compensated input signal, and a digital-to-analog (D/A) converter 66 which restores the compensated input to an analog representation of the compensated signal 34 for driving the system 30.

Figure 2:
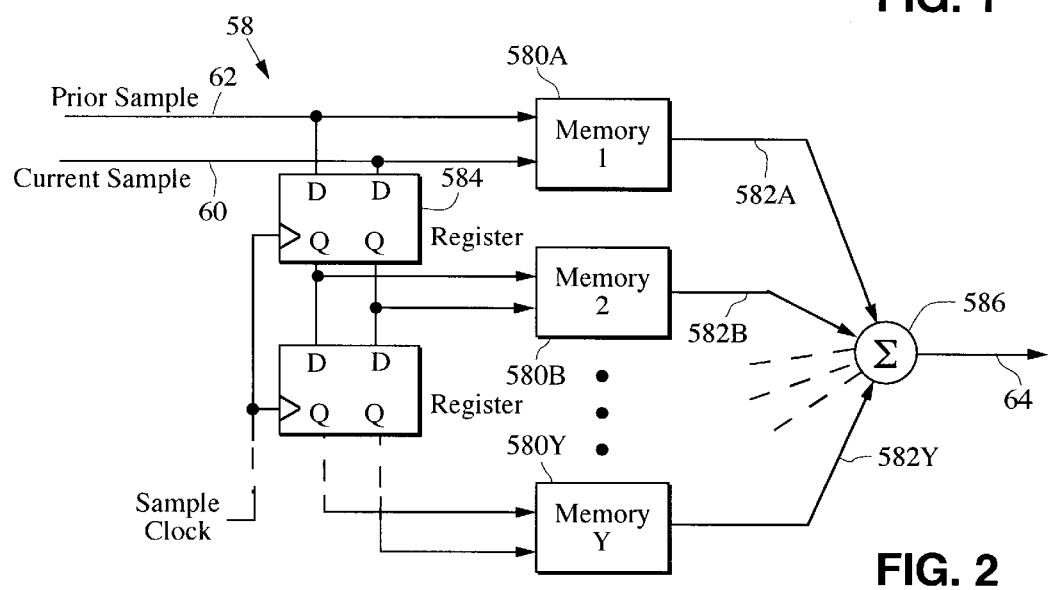
FIG. 2 is a schematic illustration of a digital algorithm for generating the compensated input, in accordance with the invention.

An aspect of the invention is the digital compensation algorithm 58, as illustrated in FIG. 2. Each sample of bit length n has $2^n$ possible amplitudes. If each current sample is coupled with its immediate predecessor sample, then a transition is defined, with the total number of possible transitions being $(2^n)^2$, or $2^{2n}$.

Note that for each possible transition, there is a preferred response from the target system 30. An erroneous response could consist of a single erroneous amplitude, for the duration of one sample time, or, more commonly, a sequence of time varying amplitudes, extending outward in time (e.g., a "ringing" response to a single step transition). Thus, the correction for a single transition needs to be a sequence of corrections extending through a sufficient period of time to completely or adequately cancel the output errors. The number of needed samples for a correction sequence the number Y. Y is determined by the period of time for which there are response deviations to a single transition in the target system, divided by the sample rate of the input compensator (which, along with the number of bits, n, is determined by the accuracy required). Thus each transition generates an input sequence of Y samples, and the composite, corrected input is the sum of the sequences generated by the last Y samples received.

This is accomplished in the exemplary algorithm embodiment of FIG. 2 by providing a series of lookup memories 580A–580Y. Memory 580A receives the current sample 60 and the prior sample 62 (defining their current transition) and outputs a first sample 582A of an input sequence appropriate for that transition. The input to memory 580A is then delayed by one sample period by a register 584A and entered into memory 580B, which generates the second sample 582B of an input sequence appropriate for that transition. (Simultaneously, memory 580A is starting the sequence for a new transition). This process is repeated through successive registers (e.g. register 584B) and memories, to memory 580Y, which generates the last sample of the correction sequences. A summation element 586 simultaneously adds all of the sequences being generated, yielding a composite, corrected input 64.

It is noted that, for the exemplary embodiment of FIG. 2, the magnitudes of the current sample and the prior sample comprise elements of the look-up table memory input. Thus, in this exemplary embodiment, the composite, corrected value is based not only on the transition value, but also on the magnitude of the prior/current sample. For example, if the target system 30 is an amplifier with the distortion of gain decreasing as amplitude increases (as well as other distortions), then the compensated input sequence for a transition occurring at a relatively large absolute magnitude would be different than for the same transition occurring at a smaller absolute magnitude.

The embodiment of the compensator 50 illustrated in FIG. 1 includes elements to convert an analog input signal into digitized form, and for conversion of the corrected input signal representation back into analog form. However, such conversion elements will be unnecessary for providing error correction of digital systems, i.e. where the input signal is already a digital value, and the system 30 is thereby driven by a digital signal representation. In such cases, the sampler 52, analog-to-digital converter 54 and the digital-to-analog converter 66 are omitted from the compensator 50. Operation of the compensator otherwise remains the same.

The following steps are carried out to provide input compensation.

1. Determine the error response E of each possible transition, which will commonly extend forward into time. This can be done by measurement or calculation.

2. Calculate a compensating input sequence which exactly cancels the error signal E. The length into time t that the compensating sequence extends is the time at which the error signal is sufficiently small that no further cancellation is necessary. Here again, this can be done by measurement or calculation.

3. Store into memory the error-canceling input sequence for each possible transition. The number of samples, Y, of each canceling sequence is determined by Y=t divided by the sampling period.

4. Cumulatively add the error-canceling sequence of each of the last Y transitions.

The response of a system to any possible input pattern is the superposition (e.g. summation) of responses of the individual transitions making up the input pattern. Therefore, if the response to the individual transition is error corrected, then the aggregate response to any input sequence is also error corrected; a finite storage of correction sequences can assure proper system response to an infinite variety of possible input signals.

Figure 3:
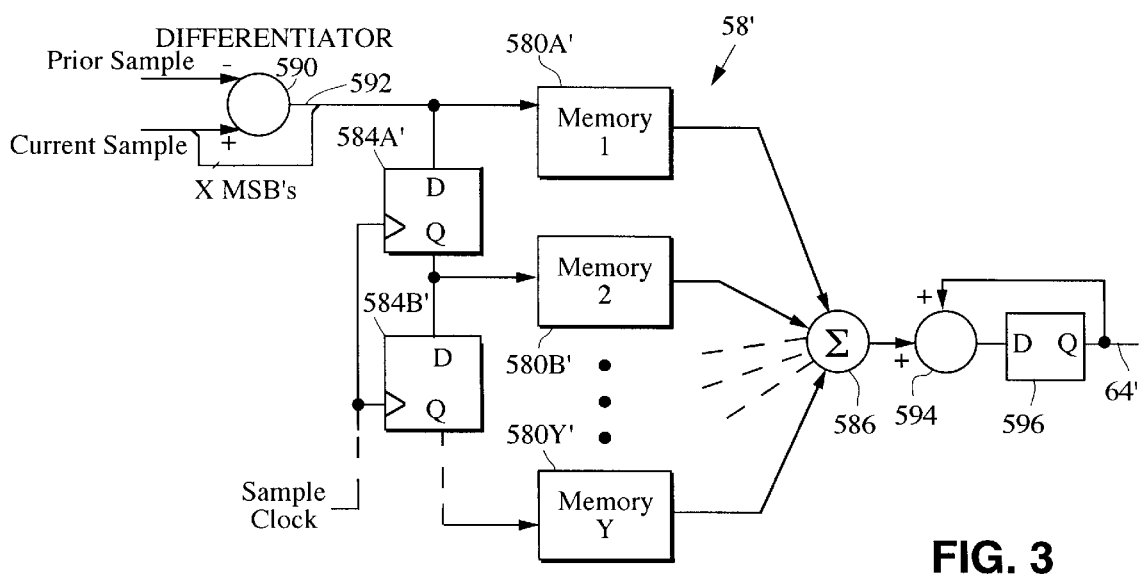
FIG. 3 illustrates an alternative digital algorithm for generating a compensated input, in accordance with the invention.

Note that $2^{2n}$ is the absolute maximum number of correction sequences that need be stored. For most systems, for example, systems with more linear distortion, the number of stored sequences can be much smaller. An alternative algorithm 58' for those systems is illustrated in FIG. 3. Here the difference is taken at differentiator 590 between each current sample and its predecessor. This differentiation results in a difference sample size of n bits. This difference sample 592 may optionally be combined with one or more most significant bits (MSBs) of the immediate sample, for more non-linear accuracy, if necessary. Registers including 584A', 584B' store successive sets of current samples and prior samples for the prior Y–1 sample periods. Memories 580A'–580Y' store lookup tables, and output compensating difference sequences, which are added in summing element 586. Then the summed difference sequences are integrated in the integrator comprising summing element 594 and register 596, cancelling the differentiation and forming the compensated input 64'. The advantage of FIG. 3 is that the look-up memories, 580A'–580Y', can be much smaller, since there are fewer input bits (memory size reduces by a factor of 2 for each reduction of input bit size by one bit).

Note that for the embodiment of FIG. 3, if no MSBs of the current sample are used, then the look-up table memory inputs consist only of transition size, with no absolute magnitude information. This could be used, for instance, where there is no gain distortion (but there may be delay or frequency distortion).

By including some MSBs of the current sample, along with the transition size (difference), then some compensation for gain differences could also be done, with the precision of the compensation increasing, as more bits of the current sample are included. In the limiting case, all of the bits of the current sample would be included, resulting in exactly the same number of bits (2n) as in the embodiment of FIG. 2, with exactly the same information but in a different form.

It is understood that the above-described embodiments are merely illustrative of the possible specific embodiments which may represent principles of the present invention. Other arrangements may readily be devised in accordance with these principles by those skilled in the art without departing from the scope and spirit of the invention.

What is claimed is:

1. A compensator for modifying the input signal to a system, wherein said input signal is a time varying series of digital samples, so as to cancel errors in the transfer function of the system, comprising:

a register responsive to the input signal and clocked by a system clock to provide a register output representative of a prior input data sample;

an input compensation algorithm apparatus responsive to a current input data sample and to the register output to provide a sequence of corrected input data values which cancel errors in the transfer function of the system, said sequence of corrected input data values dependent on the difference between the current input data sample and the prior input data sample and extending through a sufficient period of time to cancel errors in the said transfer function of said system, said sequence of corrected input data values for application to the system.

2. The compensator of claim 1 wherein the input compensation algorithm apparatus includes a digital memory apparatus for storing digital compensation values to be accessed in response to said transition value.

3. The compensator of claim 1 wherein said sufficient period of time extends over Y data sample periods, and said algorithm apparatus includes:

a chain of Y–1 serially connected data registers, so as to produce Y–1 sets of stored data samples, a first register having as its inputs said current data sample and said prior data sample, wherein each data set is a set of a current data sample and a corresponding prior data sample for the Y–1 immediately prior samples;

Y digital memory lookup tables, a first table for producing a first sample of a synthesized input sequence corresponding to said current data sample and said prior data sample, and the remaining Y–1 tables each for producing a corresponding sample of said synthesized input sequence corresponding to one of said set of stored data samples for a prior sample period, thereby producing a synthesized input sequence of Y samples;

a summing apparatus for summing said Y samples to produce said corrected input data value.

4. The compensator of claim 1 wherein said sufficient period of time extends over Y data sample periods, and said algorithm apparatus includes:

a differentiator responsive to said current data sample and said prior data sample for producing a differentiated sample value representative of the difference between said current data sample and said prior data sample;

a chain of Y–1 serially connected data registers, so as to produce Y–1 stored data samples, a first register having as its input said differentiated sample value, wherein each stored data sample is a differentiated sample value for a prior current data sample and a corresponding prior data sample for the Y–1 immediately prior samples;

Y digital memory lookup tables, a first table for producing a first sample of a synthesized input sequence corresponding to said differentiated data value, and the remaining Y–1 tables each for producing a corresponding sample of said synthesized input sequence corresponding to one of said stored differentiated data samples for a prior sample period, thereby producing a synthesized input sequence of Y samples;

a summing apparatus for summing said Y samples to produce a summed value; and an integrator for summing said summed value for each of Y sample periods to produce said corrected digitized input data value.

5. A method for correcting errors in the transfer function of an electronic system which operates on time-sampled, digital input signals, comprising a sequence of the following steps:

storing for one sample period a current data sample to provide a prior input data sample for an immediately prior sample period; and processing the current data sample and the prior input data sample to determine a sequence of corrected input data values, said sequence of corrected input data values dependent on the difference between the current data sample and the prior data sample and extending through a sufficient period of time to cancel errors in the said transfer function of said system, said sequence of corrected input data values for application to the system.

6. The method of claim 5 wherein said sufficient period of time extends over Y data sample periods, and further includes the steps of:

storing Y–1 sets of stored data samples, wherein each data set is a set of a current data sample and a corresponding prior data sample for the Y–1 immediately prior samples;

using Y digital memory lookup tables, including a first table for producing a first sample of a synthesized input sequence corresponding to said current data sample and said prior data sample, and the remaining Y–1 tables each for producing a corresponding sample of said synthesized input sequence corresponding to one of said set of stored data samples for a prior sample period, thereby producing a synthesized input sequence of Y samples;

summing said Y samples to produce said corrected input data value.

7. The method of claim 5 wherein said sufficient period of time extends over Y data sample periods, and said method includes:

differentiating said current data sample and said prior data sample to produce a differentiated sample value representative of the difference between said current data sample and said prior data sample;

storing Y–1 stored differentiated sample values for the Y–1 immediately prior samples;

using Y digital memory lookup tables, a first table for producing a first sample of a synthesized input sequence corresponding to said differentiated data value, and the remaining Y–1 tables each for producing a corresponding sample of said synthesized input sequence corresponding to one of said stored data samples for a prior sample period, thereby producing a synthesized input sequence of Y samples;

summing said Y samples to produce a summed value; and integrating said summed value for each of Y sample periods to produce said corrected input data value.

8. A compensator for modifying the input signal to a system so as to cancel errors in the transfer function of the system, wherein the input signal is a time varying analog signal, comprising:

sampling apparatus for periodically sampling the input signal, said sampling apparatus clocked by a sample clock;

an analog-to-digital converter (ADC) for converting the input data samples to a digitized current sample representation;

a register connected to the ADC output and clocked by the sample clock to provide a register output representative of a prior digitized input data sample;

an input compensation algorithm apparatus connected to the ADC output and the register output to provide a sequence of corrected digitized input data values in response to the current sample representation and the prior input data sample, said sequence of corrected input data values dependent on the difference between the current sample representation and the prior sample representation and extending through a sufficient period of time to cancel errors in said transfer function of said system;

digital-to-analog converter (DAC) apparatus for converting the sequence of corrected input data values to a sequence of corrected analog data values for application to the system.

9. The compensator of claim 8 wherein the input compensation algorithm apparatus includes a digital memory apparatus for storing digital compensation values to be accessed in response to said transition value.

10. The compensator of claim 8 wherein said sufficient period of time extends over Y data sample periods, and algorithm apparatus includes:

a chain of Y–1 serially connected data registers, so as to produce Y–1 sets of stored data samples, a first register having as its inputs said current data sample and said prior data sample, wherein each data set is a set of a current data sample and a corresponding prior data sample for the Y–1 immediately prior samples taken by the ADC;

Y digital memory lookup tables, a first table for producing a first sample of a synthesized input sequence corresponding to said digitized current data sample and said digitized prior data sample, and the remaining Y–1 tables each for producing a corresponding sample of said synthesized input sequence corresponding to one of said set of stored data samples for a prior sample period, thereby producing a synthesized input sequence of Y samples;

a summing apparatus for summing said Y samples to produce said corrected digitized input data value.

11. The compensator of claim 8 wherein said sufficient period of time extends over Y data sample periods, and said algorithm apparatus includes:

a differentiator responsive to said digitized current data sample and said digitized prior data sample for producing a differentiated sample value representative of the difference between said current data sample and said prior data sample;

a chain of Y–1 serially connected data registers, so as to produce Y–1 stored data samples, a first register having as its input said differentiated sample value, wherein each stored data sample is a differentiated sample value for a prior current data sample and a corresponding prior data sample for the Y–1 immediately prior samples taken by the ADC;

Y digital memory lookup tables, a first table for producing a first sample of a synthesized input sequence corresponding to said digitized differentiated data value, and the remaining Y–1 tables each for producing a corresponding sample of said synthesized input sequence corresponding to one of said stored differentiated data samples for a prior sample period, thereby producing a synthesized input sequence of Y samples;

a summing apparatus for summing said Y samples to produce a summed value; and an integrator for summing said summed value for each of Y sample periods to produce said corrected digitized input data value.

12. A method for correcting errors in the transfer function of an electronic system which operates on time varying analog input signals, comprising a sequence of the following steps:

periodically sampling the input signal at a rate determined by a sample clock to provide a sampled analog value;

converting the sampled analog value to a digitized current sample representation of a current data sample;

storing for one sample period said current data sample to provide a prior digitized input data sample for an immediately prior sample period;

processing the current sample representation and the prior input data sample to determine a sequence of corrected digitized input data values, said sequence of corrected input data values dependent on the difference between the current sample representation and the prior sample representation and extending through a sufficient period of time to cancel errors in said transfer function of said system; and converting the corrected input data value for application to the system.

13. The method of claim 12 wherein said sufficient period of time extends over Y data sample periods, and further includes the steps of:

storing Y–1 sets of stored data samples, wherein each data set is a set of a current data sample and a corresponding prior data sample for the Y–1 immediately prior samples;

using Y digital memory lookup tables, including a first table for producing a first sample of a synthesized input sequence corresponding to said digitized current data sample and said digitized prior data sample, and the remaining Y–1 tables each for producing a corresponding sample of said synthesized input sequence corresponding to one of said set of stored data samples for a prior sample period, thereby producing a synthesized input sequence of Y samples;

summing said Y samples to produce said corrected digitized input data value.

14. The method of claim 12 wherein said sufficient period of time extends over Y data sample periods, and said method includes:

differentiating said digitized current data sample and said digitized prior data sample to produce a differentiated sample value representative of the difference between said current data sample and said prior data sample;

storing Y–1 stored differentiated sample values for the Y–1 immediately prior samples;

using Y digital memory lookup tables, a first table for producing a first sample of a synthesized input sequence corresponding to said digitized differentiated data value, and the remaining Y–1 tables each for producing a corresponding sample of said synthesized input sequence corresponding to one of said stored differentiated data samples for a prior sample period, thereby producing a synthesized input sequence of Y samples;

summing said Y samples to produce a summed value; and integrating said summed value for each of Y sample periods to produce said corrected digitized input data value.

* * * * *